United States Patent
Knetsch

[15] 3,702,430
[45] Nov. 7, 1972

[54] CONTROL DEVICE FOR ELECTROMECHANICALLY OPERATED CLOSURE PANELS

[72] Inventor: Hans Knetsch, Penzberg, Germany

[73] Assignee: Webasto-Werke W. Baier KG, Stockdorf, Germany

[22] Filed: Dec. 20, 1971

[21] Appl. No.: 209,613

[30] Foreign Application Priority Data

Jan. 5, 1971 Germany..........P 21 00 336.1

[52] U.S. Cl................................................318/468
[51] Int. Cl............................G05d 3/00, H02p 3/06
[58] Field of Search......318/256, 280, 286, 466–468, 318/470

[56] References Cited

UNITED STATES PATENTS 2,756,990  7/1956  Reamey......................318/286
3,651,389  3/1972  Ito..............................318/466

*Primary Examiner*—Bernard A. Gilheany
*Assistant Examiner*—Thomas Langer
*Attorney*—Arthur Schwartz et al.

[57] ABSTRACT

A control device for a motor-driven closure panel, for instance an automobile sunroof panel whose closed position is an intermediate position between an open, retracted position and another open, pivoted position, the circuitry for the reversible motor including an impulse relay operating a control switch in one of the two motor connections, the relay coil being connected in parallel to the motor and between the control switch and the pole reversing switch, a position-responsive switch cutting off the relay circuit whenever the panel moves out of its closed position and energizing the impulse relay whenever the panel reaches the closed position.

8 Claims, 5 Drawing Figures

PATENTED NOV 7 1972 3,702,430

Inventor:
HANS KNETSCH
by J.H. Geigy
AGENT

CONTROL DEVICE FOR ELECTROMECHANICALLY OPERATED CLOSURE PANELS

BACKGROUND OF THE INVENTION

1. Field of the Invention

This invention relates to control devices for electromechanically operated closure panels and the like, and more especially to actuating devices for sliding panels for the purpose of closing apertures, e.g., windows, doors, or roof openings, such as sliding roofs of vehicles, in which a reversible motor drives the movable parts by way of transmission elements.

2. Description of the Prior Art

Devices of this type are known for opening and closing windows and sliding roofs, especially in motor vehicles. A pole reversing switch which reverses the direction of rotation of the motor controls the opening or closing of a roof or window. A slip clutch is usually provided in the drive to prevent stalling of the motor, and stops may be provided to limit the opening movement and fix the position for closing and maximum opening so that in these positions, if the motor is not switched off at the right moment, the clutch slips and prevents motor damage. If the motor, which in most cases is designed for brief loading only, were to be operated in one of these positions for an excessive length of time by an inattentive person, an overload fuse in the motor would protect it from damage.

This known control arrangement, applicable for simple reciprocating operations only, has the disadvantage that automatic switching off in the closed position is impossible, or can only be done with great difficulty, since the movable part in most cases either operates the switch assigned to it too soon, i.e., before the limiting position is reached, or on reaching it fails to operate the switch.

SUMMARY OF THE INVENTION

The present invention aims at providing a simple control device for automatically switching off the motor in the closed position of the movable part while in addition being capable of multiple control operations.

According to the invention, an impulse relay, alternatively called a stepping relay, is provided, and the control winding thereof is connected in parallel with the motor connections, while its control switch opens and closes one of the connecting leads between the motor and the pole reversing switch between the points of connection of the relay control winding and the connecting terminal of the motor.

A position-responsive switch operating the impulse relay opens and closes one of the connecting leads from its control winding to one of the connecting leads between the motor and the pole reversing switch. This position-responsive switch is actuated by way of a control device which is driven by the motor in such a way that the switch is closed in the closed position of the part but breaks the circuit in the opening and closing operation.

In a preferred embodiment of the control device of the invention the control arrangement of the position-responsive switch operating the impulse relay is so designed that it also closes the switch in the extreme opening position of the movable part.

The control device of the invention is particularly suitable when the control arrangement for the position-responsive switch includes a control member, e.g., a cam, which can be moved from its closing position in two different directions as the motor is operated in different directions of rotation. In this way, with a corresponding mechanical construction of the roof drive, (see for example German Prel. Publication No. 1,191,479), not only is it possible to adjust the zero (closed) position more easily but, if the part which can be moved out of and into an aperture is built for two different movements, e.g., a pivoting and a sliding movement, it is also possible without additional control devices to obtain convenient control of both movements if the motor is coupled with the movable part by way of transmission elements in such a way that when the control member is moved out of the closed position in different directions, different movements of the movable parts are produced.

BRIEF DESCRIPTION OF THE DRAWINGS

An embodiment of the control device of the invention will now be described by way of example with reference to the accompanying drawings in which further features of the invention are mentioned. In the drawings

DESCRIPTION OF THE PREFERRED EMBODIMENT

Figure 1:
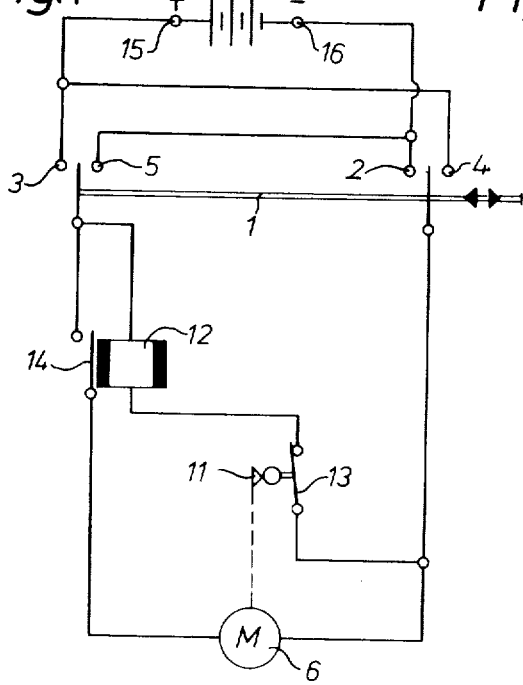
FIG. 1 represents a circuit diagram for the control device of the invention in the closed position of the movable part.
Figure 3:
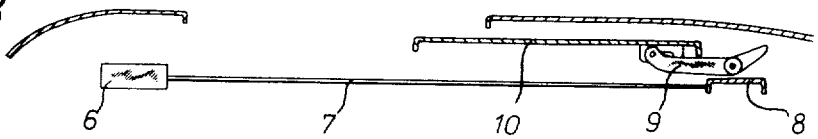
FIG. 3 represents a schematic longitudinal cross-section of the sliding roof of an automobile in the open position.

In FIG. 1 is shown a pole reversing switch 1 which is automatically reset to its median position by means of a spring (not shown). It can be actuated by pushing to engage contacts 2,3 and by pulling to engage contacts 4,5. A motor 6 can thus be operated in both directions of rotation whereby, as indicated in FIGS. 3 to 5, through a stiff, push-pull cable 7, a bridge 8 and a lever 9, it moves a panel cover 10 which can be either pivoted upwardly over the roof, or lowered and retracted from an aperture in the roof.

Figure 2:
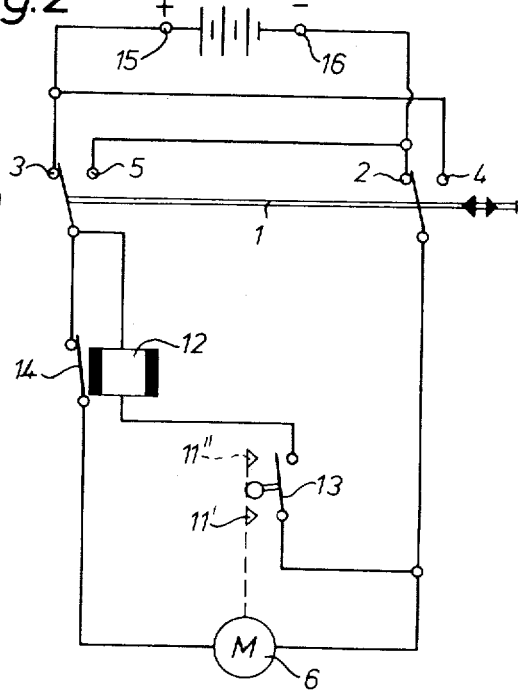
FIG. 2 represents the circuit diagram of FIG. 1 in the open position of the movable part.

Together with the rotational motion of the motor 6, a control member 11 is also moved out of its "closed" position 11 shown in FIG. 1 into the position 11' shown in FIG. 2, or into the position 11''. This control member 11 actuates a switch 13 which in turn energizes an impulse relay 12. This impulse relay 12 only responds to the onset of current flow and, when energized, operates a control switch 14.

Figure 4:
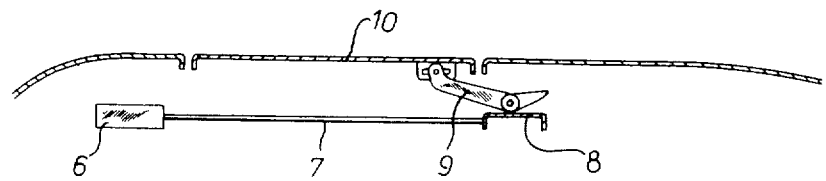
FIG. 4 shows the device of FIG. 3 with the roof panel in the closed position.
Figure 5:
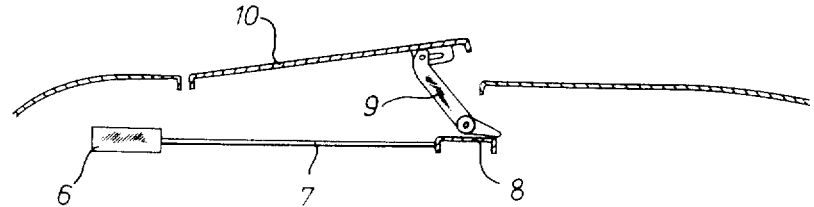
FIG. 5 shows the device of FIG. 3 with the roof panel in an upwardly pivoted third position.

If, in the closed position shown in FIGS. 1 and 4, the pole reversing switch is switched against the contacts 2 and 3, the impulse relay 12 first receives current by way of the closed position-responsive switch 13, as a result of which the switch 14 closes and the motor 6 is connected to the current supply terminals 15 and 16. As the motor turns, the roof panel 19 is lowered and retracted to the open position shown in FIG. 3, and simultaneously the control member 11 is moved into the position 11'', as a result of which the switch 13 opens. The opening movement is stopped either by the release of the pole reversing switch 1, or by abutment of the panel 10 against a stop (not shown here), in which case a slip clutch of known kind on the motor shaft prevents the motor 6 from being blocked until the motor is switched off by releasing the switch 1.

When it is desired to move the panel 10 from the open position into the closed position, the pole reversing switch 1 is moved into contact with the contacts 4 and 5, whereby the motor 6 at once receives current through the still-closed control switch 14, but now rotating in the opposite direction since its polarity has been reversed. As soon as the roof panel 10 reaches the closed position, the control member 11 closes the position-responsive switch 13 as it moves back from its "open" position 11'. The impulse relay 13 is thereby energized and the control switch 14 opens so that the motor 6 is automatically switched off.

If, after prior release, the pole reversing switch 1 is again switched against the poles 4 and 5, the closed switch 13 causes the relay 12 to close the control switch 14, whereupon the motor resumes its rotation so that the cover 10 is swung out, since, as shown in FIG. 5, the transport bridge 8 is thereby moved beyond the closed position in the same direction as in the closing movement, the control member 11 now moving into the "pivoted" position 11''. As in the opening procedure, the pivoting movement is stopped by either the release of the pole reversing switch 1 or by abutment against a stop, with actuation of the slip clutch.

In order to return the cover 10 to its closed position, the pole reversing switch 1 is switched against the poles 2 and 3. The motor 6 receives current through the closed switch 14 immediately, and the bridge 8 as well as the control member 11 are moved from their "-pivoted" positions into their "closed" positions. Switching off occurs automatically through the closing of the position-responsive switch 13, as described for the closing procedure.

It is of course also possible to provide several control members, similar to member 11, which travel at a fixed distance from one another. For example, the control device of the invention may have three cams, one for each of the two extreme positions and one for the intermediate "closed" position of the cover 10. Such an arrangement affords additional protection for the slip clutch and motor.

The shape of the actuating cam 11 is preferably such that it causes the cover 10 to come to a stop in the same intermediate position, regardless of the direction from which it moves into the closed position. Thus, a longer coasting displacement from the actuation of switch 13 to the stopping point of the cover 10 merely requires a correspondingly longer actuating cam 11.

The invention is not restricted to the details of embodiment which has been described, but can be modified in various ways without departing from the scope of the invention.

What is claimed is:

1. A control device for an electromechanically operated closure panel, for example, of the kind used in so-called power windows, power doors, and power sunroofs of automobiles and the like, comprising in combination a reversible electric motor and power source therefor;
   transmission means between the motor and the closure panel capable of moving the latter into and out of a closed position;
   a pole reversing switch arranged between the power source and the connecting leads of the motor;
   an relay having its winding connected in parallel with the motor between the motor connections and the reversing switch;
   a control switch actuated by the relay and arranged to open and close at least one of the motor leads between the parallel connections of the relay winding and the motor;
   a position-responsive switch arranged in one of the connections of the relay winding;
   means for actuating the position-responsive switch in response to the movement of the closure panel and its transmission means; the actuating means actuating the position-responsive switch and the relay to cut off the motor as soon as the closure panel reaches a predetermined position.

2. A control device as defined in claim 1, wherein the position-responsive switch is arranged to remain open when it is not actuated by the actuating means, the latter being so arranged in their relative motion to the switch that the switch is closed when the closure panel is in its closed position, the arrival of the closure panel in the closed position thus causing the position-responsive switch to close, thereby actuating the relay and the control switch to cut off the power to the motor, the closed circuit of the relay winding permitting re-closing of the control switch through opening and re-closing of the pole reversing switch.

3. A control device as defined in claim 2, wherein the actuating means are so arranged that the position-responsive switch is closed in the closed position as well as in the fully open position of the closure panel.

4. A control device as defined in claim 1, wherein the position-responsive switch is arranged to remain open when not actuated, the actuating means including at least one actuating cam moving relative to the switch in synchronism with the movement of the closure panel, the cam upon reaching the switch cutting off the power to the motor by energizing the relay and opening the control switch, the cam maintaining the position-responsive switch closed until a new movement of the closure panel is initiated.

5. A control device as defined in claim 4, wherein the actuating means include an actuating cam which actuates the position-responsive switch in a position of the closure panel which is located intermediate the two extreme panel positions.

6. A control device as defined in claim 5, wherein the actuating cam has such a length that its cutting off of the motor causes the closure panel to come to a stop in approximately the same intermediate position regardless of the direction from which the panel moves into the intermediate position.

7. A control device as defined in claim 5, wherein the actuating means also include an actuating cam for at least one of the two extreme positions of panel displacement.

8. A control device as defined in claim 5, wherein the closure panel represents the roof panel of a so-called automobile sunroof;

the transmission means include a bridge which is horizontally displaceable between two end positions, a push-pull cable moving the bridge in response to the rotation of the reversible motor, and linkage means between the bridge and the roof panel which cause the latter to move from an extreme upwardly pivoted position, through a horizontal closed position, into an extreme retracted open position, and vice versa;

whereby the intermediate panel position represents the horizontal closed position of the sunroof panel.

* * * * *